US011442282B2

United States Patent
Sales et al.

(10) Patent No.: US 11,442,282 B2
(45) Date of Patent: Sep. 13, 2022

(54) OPTICAL ELEMENT INCLUDING A PLURALITY OF REGIONS

(71) Applicant: VIAVI SOLUTIONS INC., San Jose, CA (US)

(72) Inventors: Tasso R. M. Sales, Rochester, NY (US); George Michael Morris, Victor, NY (US)

(73) Assignee: VIAVI SOLUTIONS INC., San Jose, CA (US)

( * ) Notice: Subject to any disclaimer, the term of this patent is extended or adjusted under 35 U.S.C. 154(b) by 325 days.

(21) Appl. No.: 16/661,651

(22) Filed: Oct. 23, 2019

(65) Prior Publication Data

US 2020/0133013 A1    Apr. 30, 2020

Related U.S. Application Data

(60) Provisional application No. 62/751,337, filed on Oct. 26, 2018.

(51) Int. Cl.
| | |
|---|---|
| *G02B 27/09* | (2006.01) |
| *G02B 5/18* | (2006.01) |
| *G02B 27/48* | (2006.01) |

(52) U.S. Cl.
CPC .......... *G02B 27/0944* (2013.01); *G02B 5/18* (2013.01); *G02B 27/48* (2013.01)

(58) Field of Classification Search
CPC ...... G02B 27/0944; G02B 5/18; G02B 27/48; G02B 5/0215; G02B 5/0221; G02B 27/0927; G02B 27/0961; G02B 27/4205; G02B 5/00; G06F 3/017
See application file for complete search history.

(56) References Cited

U.S. PATENT DOCUMENTS

| | | | |
|---|---|---|---|
| 9,052,512 B2 * | 6/2015 | Miyasaka | .......... G02B 27/0944 |
| 2004/0130790 A1 | 7/2004 | Sales | |
| 2005/0083571 A1 | 4/2005 | Shimizu | |
| 2006/0274237 A1 | 12/2006 | Nelson et al. | |
| 2008/0106746 A1 | 5/2008 | Shpunt et al. | |
| 2009/0153974 A1 | 6/2009 | Sales | |
| 2009/0161191 A1 | 6/2009 | Powell | |
| 2010/0302479 A1 | 12/2010 | Aronson et al. | |
| 2014/0376220 A1 | 12/2014 | Shen et al. | |
| 2015/0061065 A1 | 3/2015 | Gill et al. | |
| 2017/0146214 A1 | 5/2017 | Purchase | |
| 2018/0059304 A1 | 3/2018 | Bhargava et al. | |

FOREIGN PATENT DOCUMENTS

| | | |
|---|---|---|
| JP | 2007033578 | 2/2007 |
| JP | 2007-108400 A | 4/2007 |
| JP | 2009530604 | 8/2009 |
| JP | 2013033203 | 2/2013 |

(Continued)

*Primary Examiner* — Robert E. Tallman
(74) *Attorney, Agent, or Firm* — Mannava & Kang, P.C

(57) ABSTRACT

An optical element comprising a body having a surface, wherein the surface has a plurality of regions periodically arranged in a tessellation, and wherein each region of the plurality of regions has a random spatial distribution of microstructures is disclosed. An optical system comprises a light source; and the optical element is also disclosed. Methods of making and using the optical element and the optical system are also disclosed.

17 Claims, 14 Drawing Sheets

(56) References Cited

FOREIGN PATENT DOCUMENTS

| | | |
|---|---|---|
| JP | 2017083815 | 5/2017 |
| JP | 2018159923 A | 11/2018 |
| JP | 2019152753 | 9/2019 |
| KR | 10-20080040718 | 5/2008 |
| KR | 10-20090006216 | 1/2009 |
| KR | 101826962 B1 | 2/2018 |
| WO | 2007029714 A | 3/2007 |
| WO | 2015/095189 A1 | 6/2015 |
| WO | 2016122404 | 8/2016 |

* cited by examiner

OPTICAL ELEMENT INCLUDING A PLURALITY OF REGIONS

RELATED APPLICATIONS

This application claims priority to U.S. Provisional Application No. 62/751,337, filed Oct. 26, 2018, the entire disclosure of which is hereby incorporated by reference.

FIELD OF THE INVENTION

The present invention relates to an optical element comprising a body having a surface, wherein the surface has a plurality of regions periodically arranged in a tessellation, and wherein each region of the plurality of regions has a random spatial distribution of microstructures. An optical system comprises a light source; and the optical element. Methods of making and using the optical element and the optical system are also disclosed.

BACKGROUND OF THE INVENTION

In applications related to 3D scanning and gesture recognition, one utilizes optical components to project a light pattern over a scene being probed, typically in association with lasers with a wavelength in the range of about 700 nm to about 1000 nm. The light pattern depends on the probing technique and can take various forms, such as a periodic grid of spots, lines, stripes, checkerboards, etc.

Current techniques used to project a light pattern rely on one or multiple diffractive optical elements to produce a certain distribution of diffraction orders. Diffractive optical elements (DOE's) are naturally suited to the task of producing light patterns, such as diffraction patterns. A DOE can be described as a thin surface structure, typically one wavelength of light, that can produce a light pattern by interference and/or diffraction. Accordingly, a cone of light that is output from a DOE is defined by its minimum feature which is related in an inverse proportion. That is, increasingly large spread angles require decreasingly smaller features. DOE's, however, are extremely sensitive to deviations from the design wavelength or fabrication errors with the main consequence being that the zero diffraction order becomes much stronger than the other diffraction orders, which poses an eye-safety problem that cannot be tolerated in 3D sensing applications.

U.S. Pat. No. 8,630,039, for example, describes DOE's to produce a spot pattern. A random spot pattern often needs to cover a wide angular range to be able to capture a large portion of the scene. To illuminate a wide-angle scene a DOE requires a pattern with very small features. For example, to cover a 60-degree range with a laser of wavelength 850 nm, a DOE with 1.7 μm minimum feature would be necessary. A wider angular range would require even smaller features. For maximum efficiency, a DOE needs to be designed and fabricated as a grayscale, continuous phase profile. However, it can be challenging to produce a grayscale DOE with such small features. Instead, grayscale DOEs are generally produced with a binary phase profile having an efficiency of at most 80%. The remaining energy is lost to higher diffraction orders outside of the main light pattern. The use of multiple DOEs, such as disclosed in U.S. Pat. No. 8,630,039, helps to address the zero diffraction order. However, the use of multiple DOEs has a compounding effect and practical efficiency is around 50%-60%

SUMMARY OF THE INVENTION

In an aspect, there is disclosed an optical element comprising, a body having a surface, wherein the surface has a plurality of regions periodically arranged in a tessellation, and wherein each region of the plurality of regions has a random spatial distribution of microstructures.

In another aspect, there is also disclosed an optical system, comprising, a light source; and an optical element including a body having a surface, wherein the surface has a plurality of regions periodically arranged in tessellation, and wherein each region of the plurality of regions has a random spatial distribution of microstructures.

In another aspect, there is further disclosed a method of using an optical system, including projecting an input beam from a light source to an optical element, wherein the optical element includes a body having a surface, wherein the surface has a plurality of regions periodically arranged in a tessellation, and wherein each region of the plurality of regions has a random spatial distribution of microstructures; and shaping the input beam into a target pattern.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

DETAILED DESCRIPTION OF THE DRAWINGS

The present disclosure in its several aspects and embodiments can be more fully understood from the detailed description and the accompanying drawings, wherein.

Figure 7:
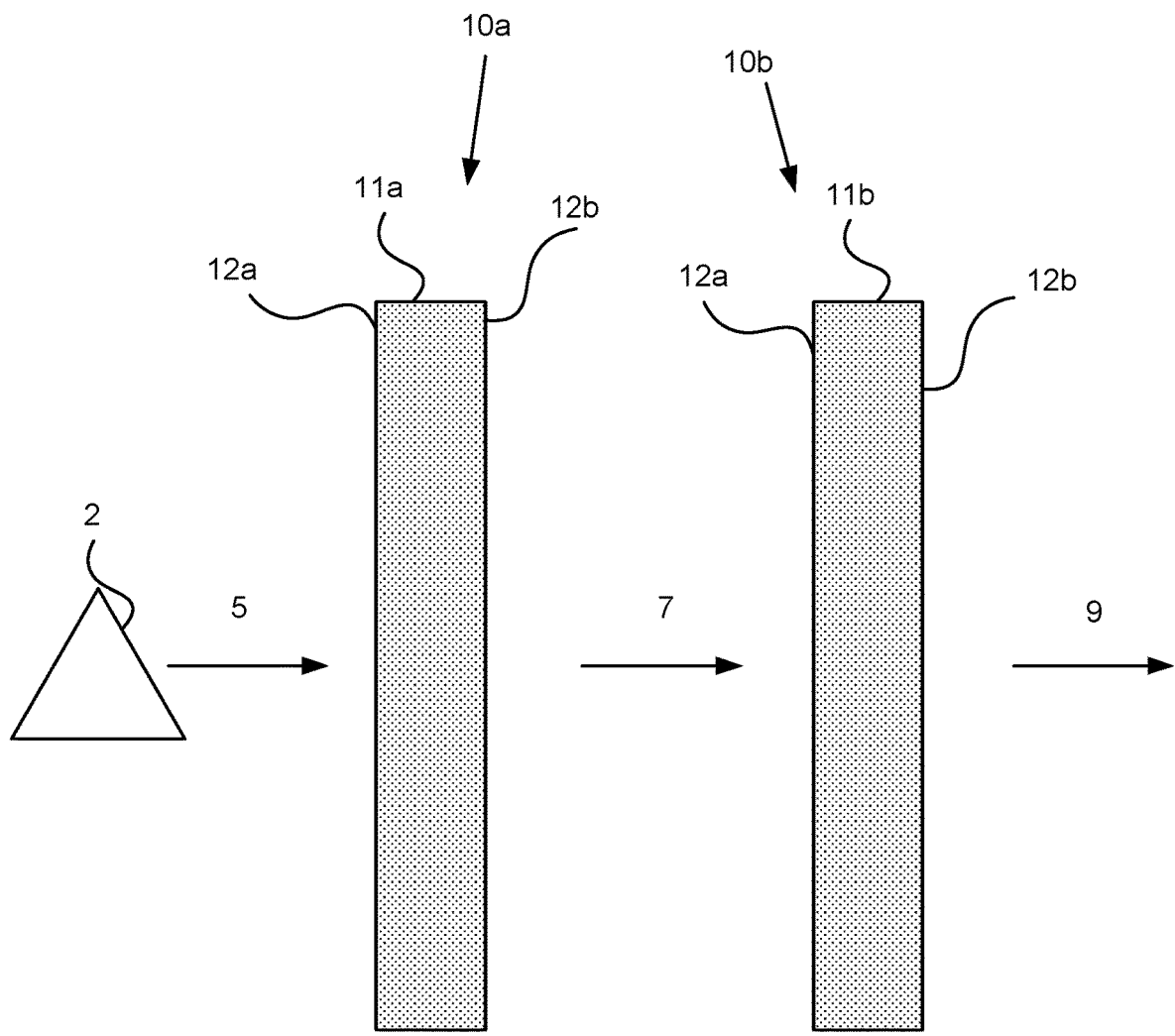
Figure 8:
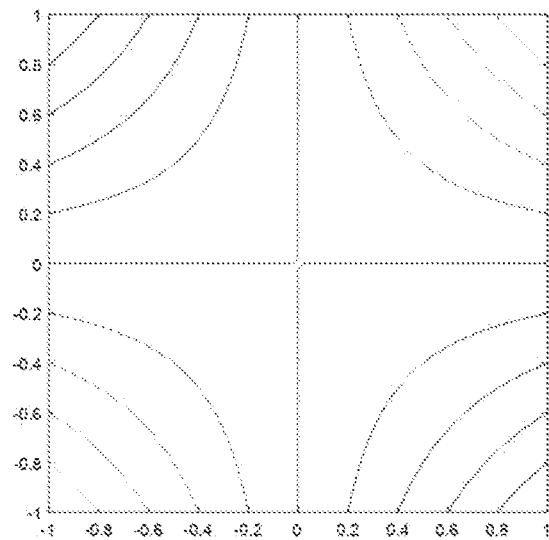
Figure 8:
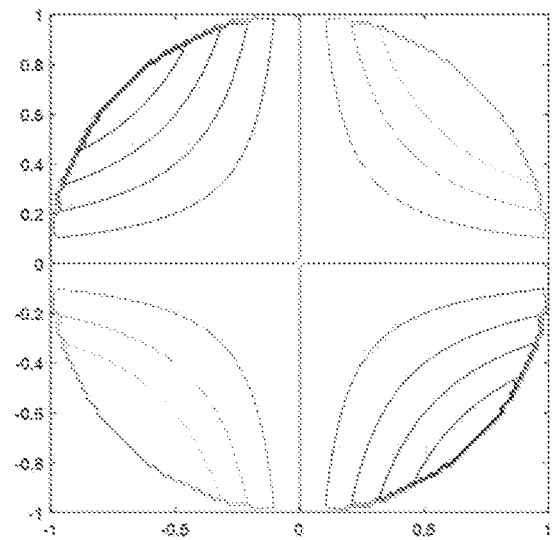
Figure 8:
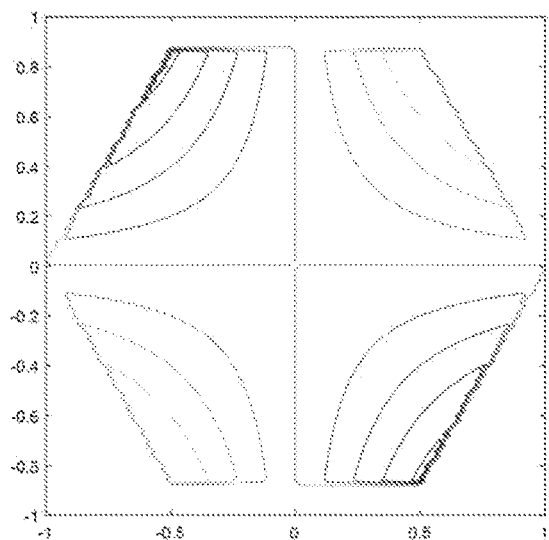
Figure 8:
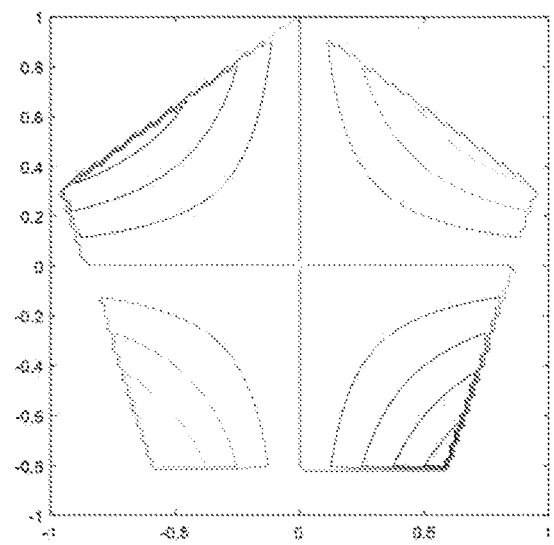
Figure 9:
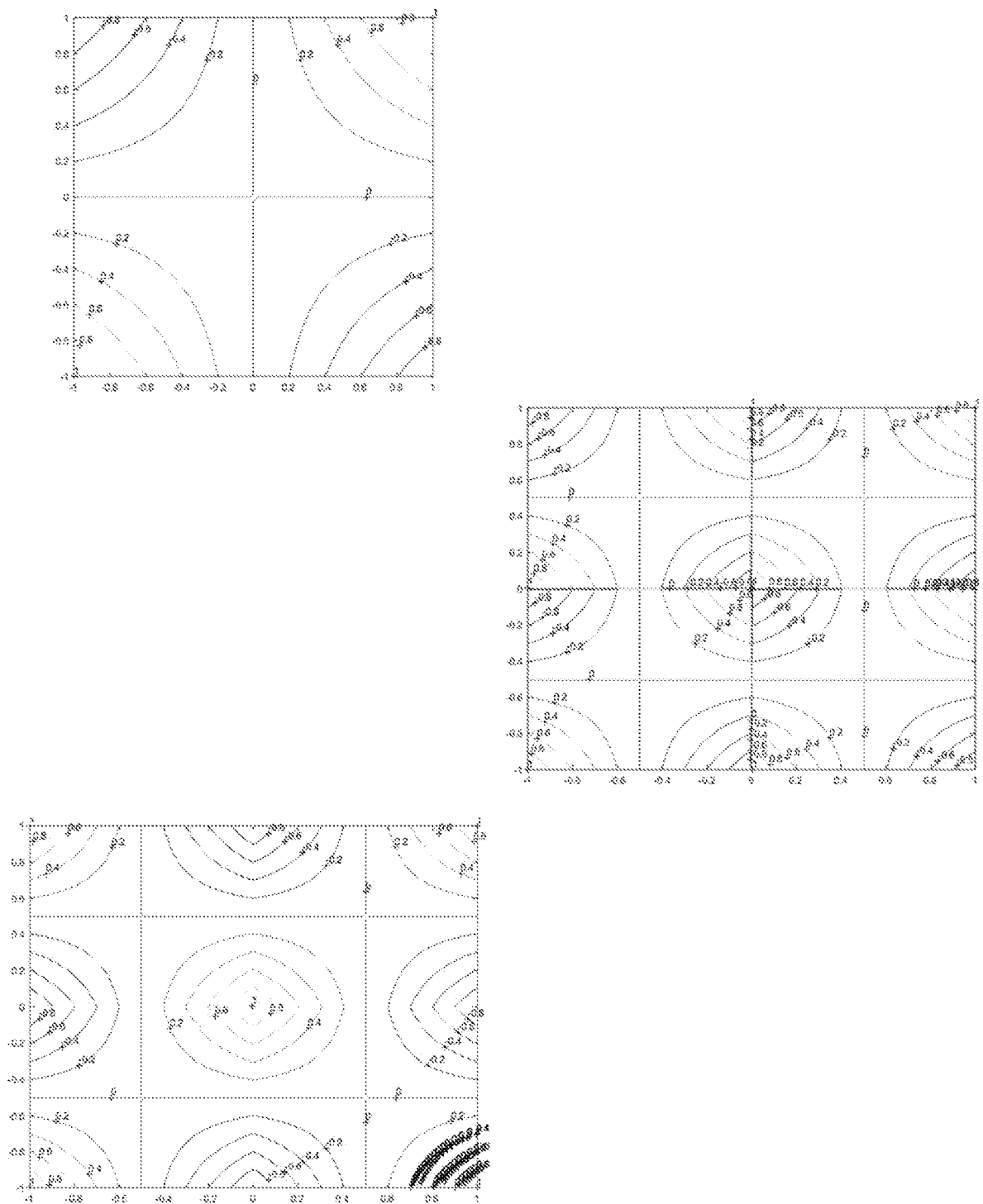
Figure 10:
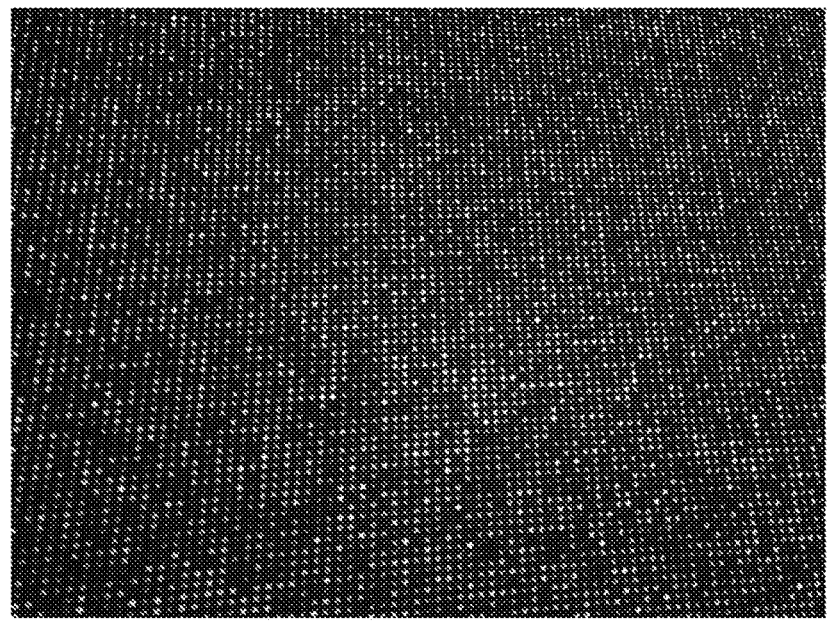
Figure 11:
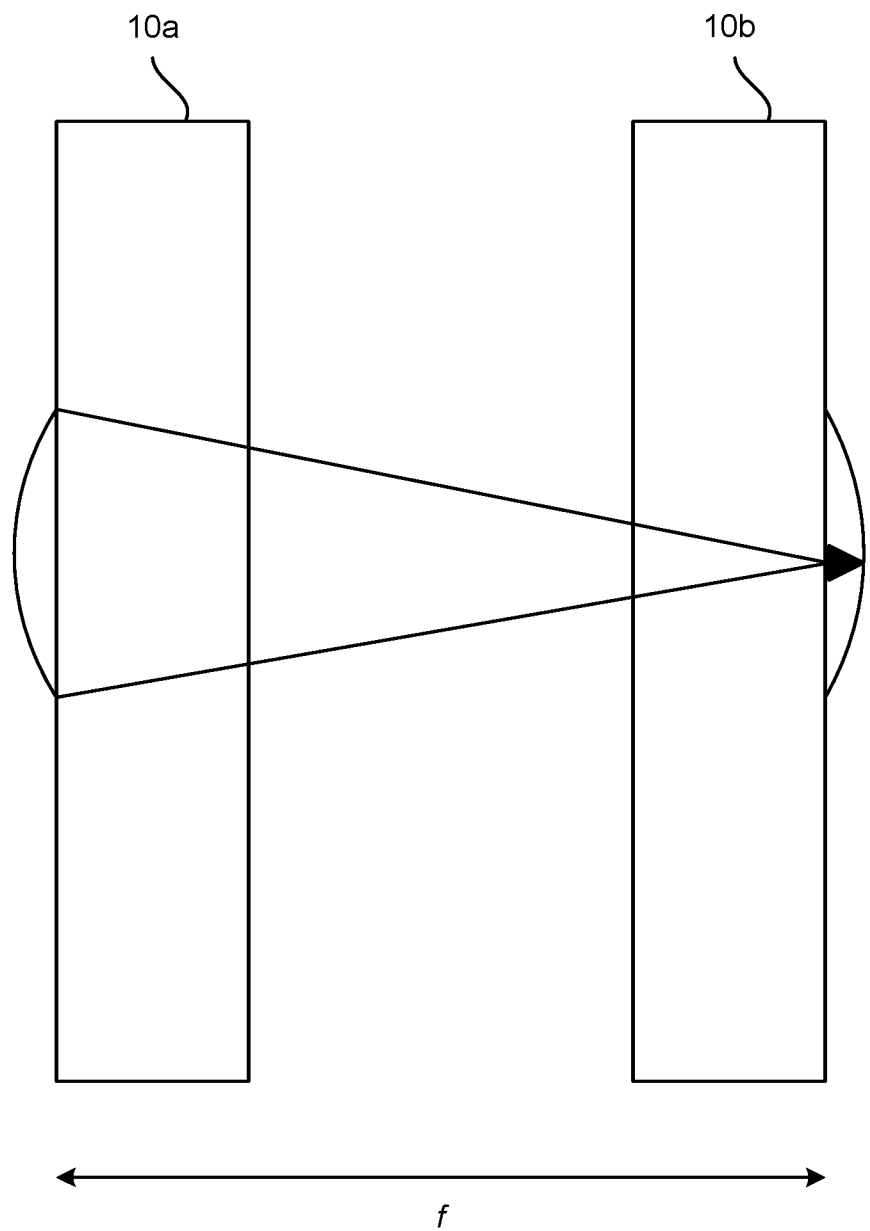
Figure 12:
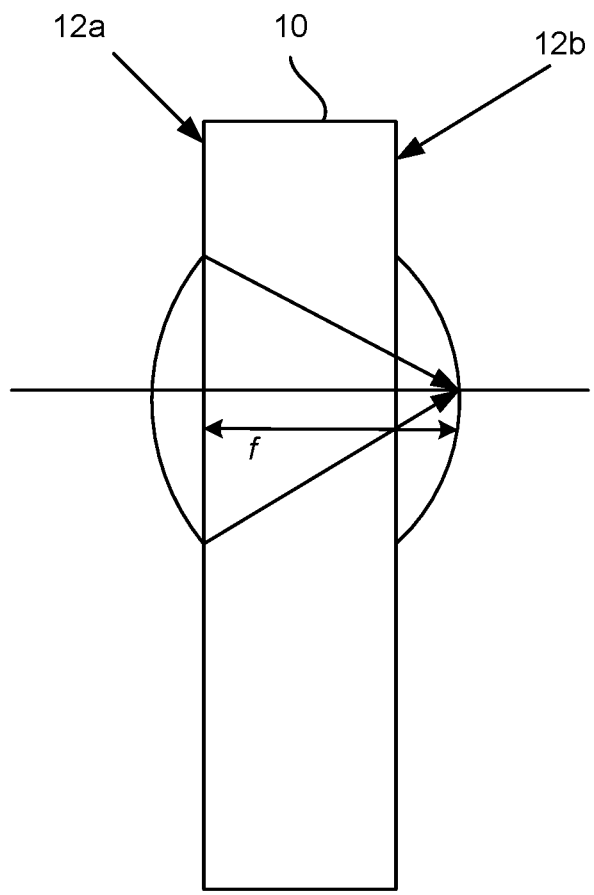

FIG. 7 a diagram of an optical system including an optical element according to an aspect of the invention;

FIG. 8 is a representation of contour plots with various microstructures with square, circular, hexagonal, and pentagonal outer geometric boundaries;

FIG. 9 is a representation of contour plots with various microstructures defined by a saddle-shaped profile and combinations thereof;

FIG. 10 illustrates a target pattern with speckle produced with an optical element according to an aspect of the present invention;

FIG. 11 is a diagram of optical elements 10 in a series in which the microstructures are characterized by a focal length and the separation between the optical elements matches the focal length; and FIG. 12 is a diagram of an optical element in which the microstructures are characterized by a focal length and a thickness of the body between the tessellation surface matches said focal length.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings.

Accordingly, it is an object of the present invention to provide an improved an optical element can comprise a body having a surface, wherein the surface has a plurality of regions periodically arranged in a tessellation, and wherein each region of the plurality of regions has a random spatial distribution of microstructures. An optical system can comprise a light source 2, and the optical element 10.

The optical element can receive an input beam 5 from a light source 2, such as a laser. The optical element can project the input beam 5 as a target pattern 7, 9, such as a random distribution of spots. The optical element can exhibit several properties, such as projecting the input beam 5 with high efficiency, and/or projecting the target pattern 7, 9 with speckle without a higher intensity in the zero diffraction order. In an aspect, the optical element can project the input beam 5 as a target pattern 7, 9 with speckle that does not change with any movement of the light source 2 with respect to the optical element.

Figure 1:
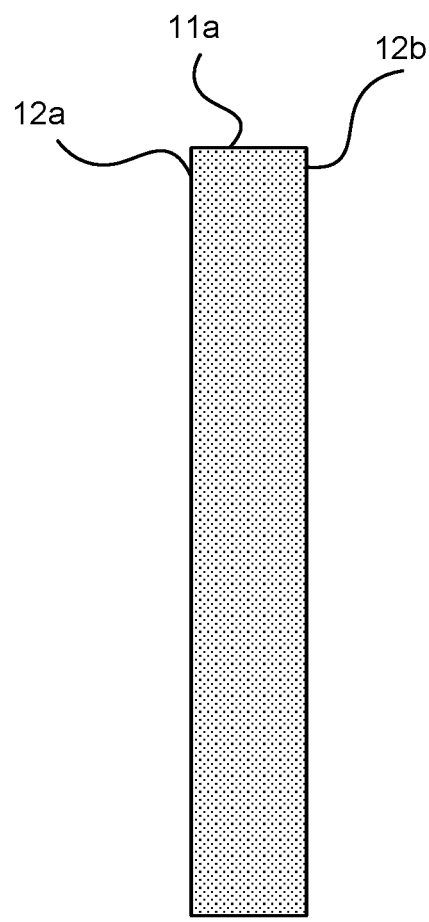
FIG. 1 is a diagram of an optical element according to an aspect of the invention.

FIG. 1 illustrates an optical element 10, according to an aspect of the invention, including a body 11 having a surface 12, such as a first surface 12a and a second surface 12b. FIG. 7 illustrates an optical system 100 including a first optical element 10a in series with a second optical element 10b, according to another aspect of the invention. Each of the first optical element 10a and the second optical element 10b can be similarly described. For example, first optical element 10a can include a first body 11a having a surface 12, such as a first surface 12a and a second surface 12b; and a second optical element 10b can include a second body 11b having a surface 12, such as a first surface 12a and a second surface 12b. For simplicity sake, the disclosures herein relating to the optical element (10, 10a, and 10b), body (11, 11a, and 11b) and surface (12, 12a, and 12b) are equally applicable to each respective component, unless otherwise indicated.

The body 11 of the optical element 10 can include an optical material. Non-limiting examples of optical material suitable for use as the body 11 include glass or plastic, such as UV-cure polymers, polycarbonate, acrylic, fused silica, silicon or varieties thereof, such as amorphous silicon. Other optical materials can also be used. Further, the body 11 can comprise a single optical material or a multiplicity of optical materials bonded together in multiple layers, which can include substrates for mechanical support and other layers such as those for anti-reflection coating or other layers for other purposes, such as ITO and metal coatings.

The body 11 of the optical element 10 can include a surface 12, such as a first surface 12a and a second surface 12b. The first surface 12a can be oppositely oriented the second surface 12b. In an aspect, the optical element 10 can include any number of surfaces 12, for example, one surface, two surfaces, three surfaces, etc. The number of surfaces 12 of the optical element 10 can be dependent upon the shape of the optical element 10.

Figure 2A:
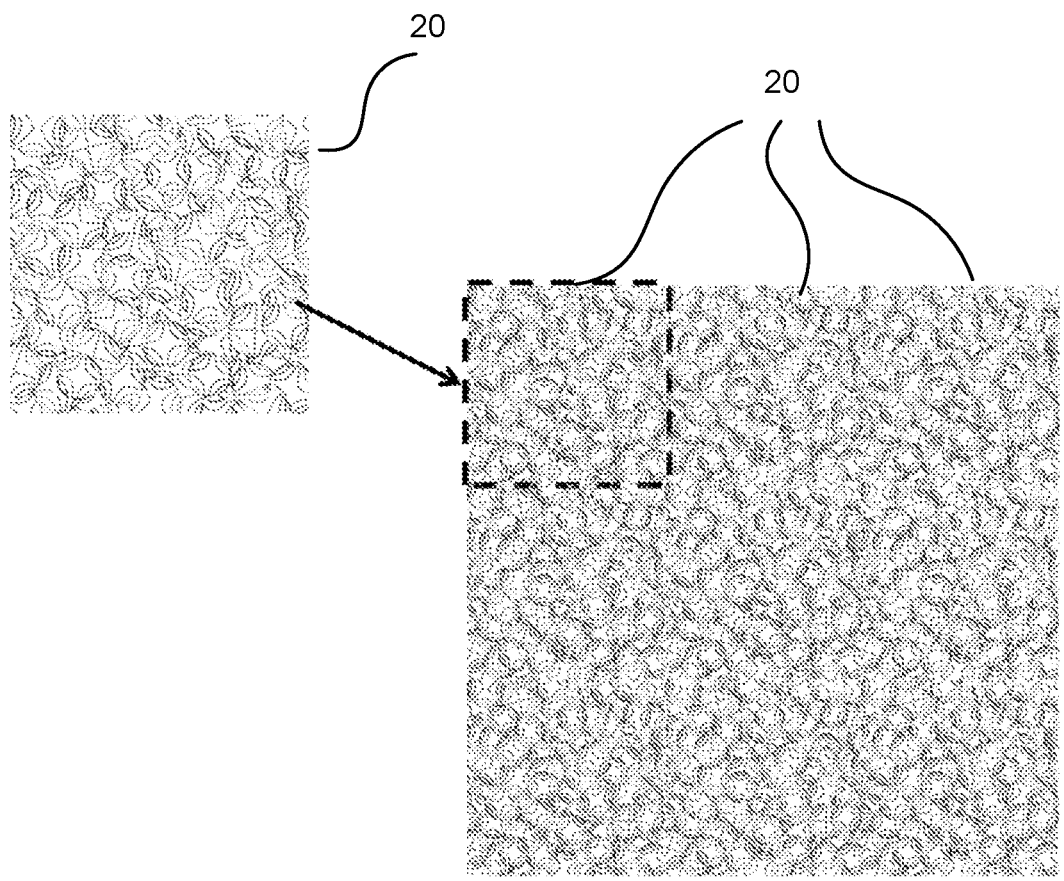
FIG. 2A is a representation of a plurality of regions periodically arranged in a tessellation according to an aspect of the invention.
Figure 2B:
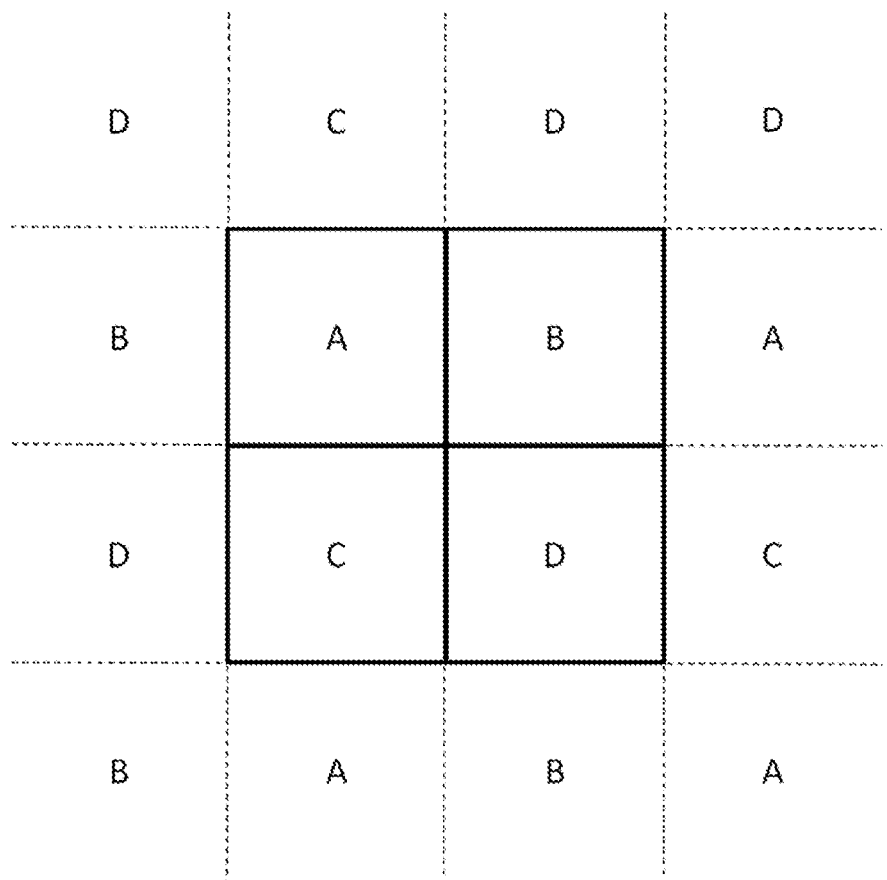
FIG. 2B illustrates four regions of microstructures with a square outer geometric boundary in a tessellation, where the regions are periodically arranged in a repeating sequence in two orthogonal dimensions.
Figure 2C:
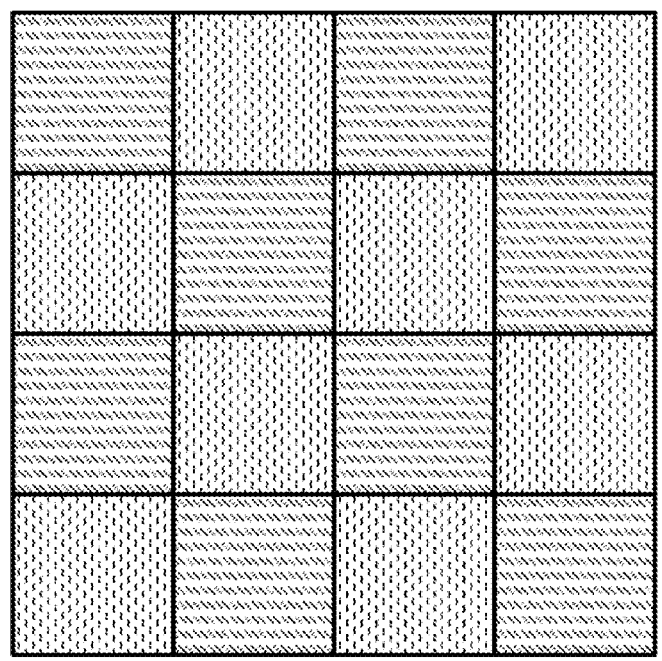
FIG. 2C is a representation of two regions of microstructures with a square outer geometric boundary in a checkerboard grid.

The surface 12, such as the first surface 12a and/or second surface 12b, of the body 11 can have a plurality of regions 22 periodically arranged in a tessellation. Each region 20 of the plurality of regions 22 can have an outer geometric boundary than can abut (without gaps) an outer boundary of an adjacent region of the plurality of regions 22. As shown in FIG. 2A, the plurality of regions 22 is periodically arranged, for example in a 3×3 array. Each region 20, such as indicated by A, B, C, and D, can be arranged in a repeating sequence in two orthogonal dimensions of the plurality of regions 22, as shown in FIG. 2B. FIG. 2C illustrates two regions, indicated by different patterns, arranged in a checkerboard.

Figure 3:
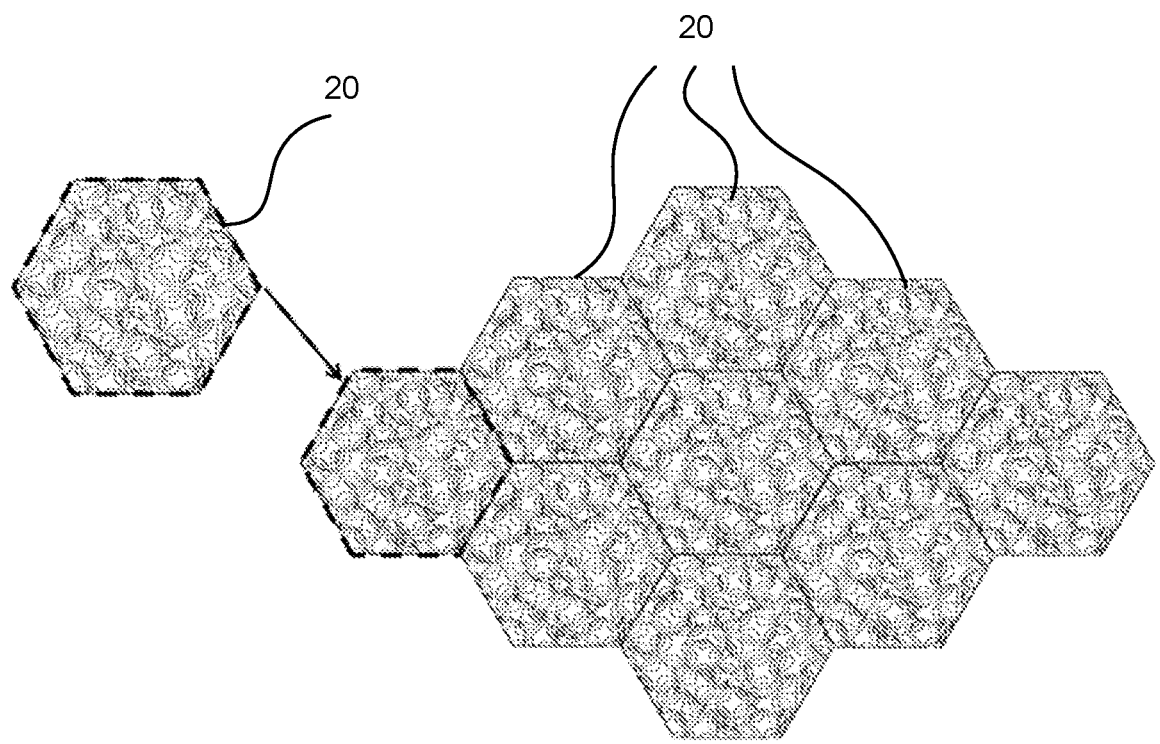
FIG. 3 is a representation of a plurality of regions periodically arranged in a tessellation according to another aspect of the invention.

The outer geometric boundary of each region 22 of the plurality of regions 20 can be any polygon shape, for example, a triangle, a square, a rectangle, a pentagon, a hexagon, a heptagon, an octagon, etc. In an aspect, each region of the plurality of regions can have a same outer geometric boundary. As shown in FIG. 2A, each region 20 can have a square shape and the plurality of regions 22 can also form a periodic arrangement in a tessellation, also in the shape of a square. In an aspect, the outer geometric boundary can be an arbitrary shape. Each region 20 can include a random spatial distribution of microstructures, such as saddle-shaped microstructures. As shown in FIG. 3, each region 20 can have a hexagon shape and the plurality of regions 22 can form a periodic arrangement in a tessellation, in an arbitrary shape. In an example, each region 20 can include a random spatial distribution of saddle-shaped microstructures.

Figure 4:
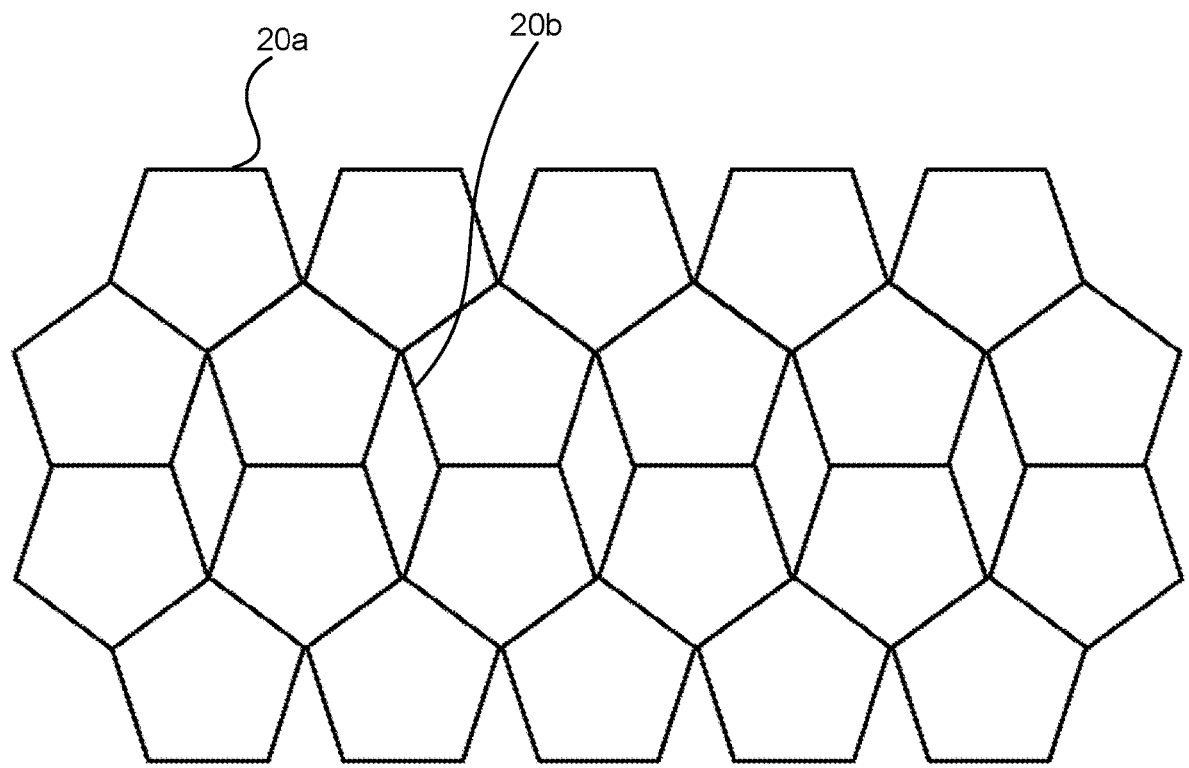
FIG. 4 is a representation of a plurality of regions periodically arranged in a tessellation according to another aspect of the invention.
Figure 5:
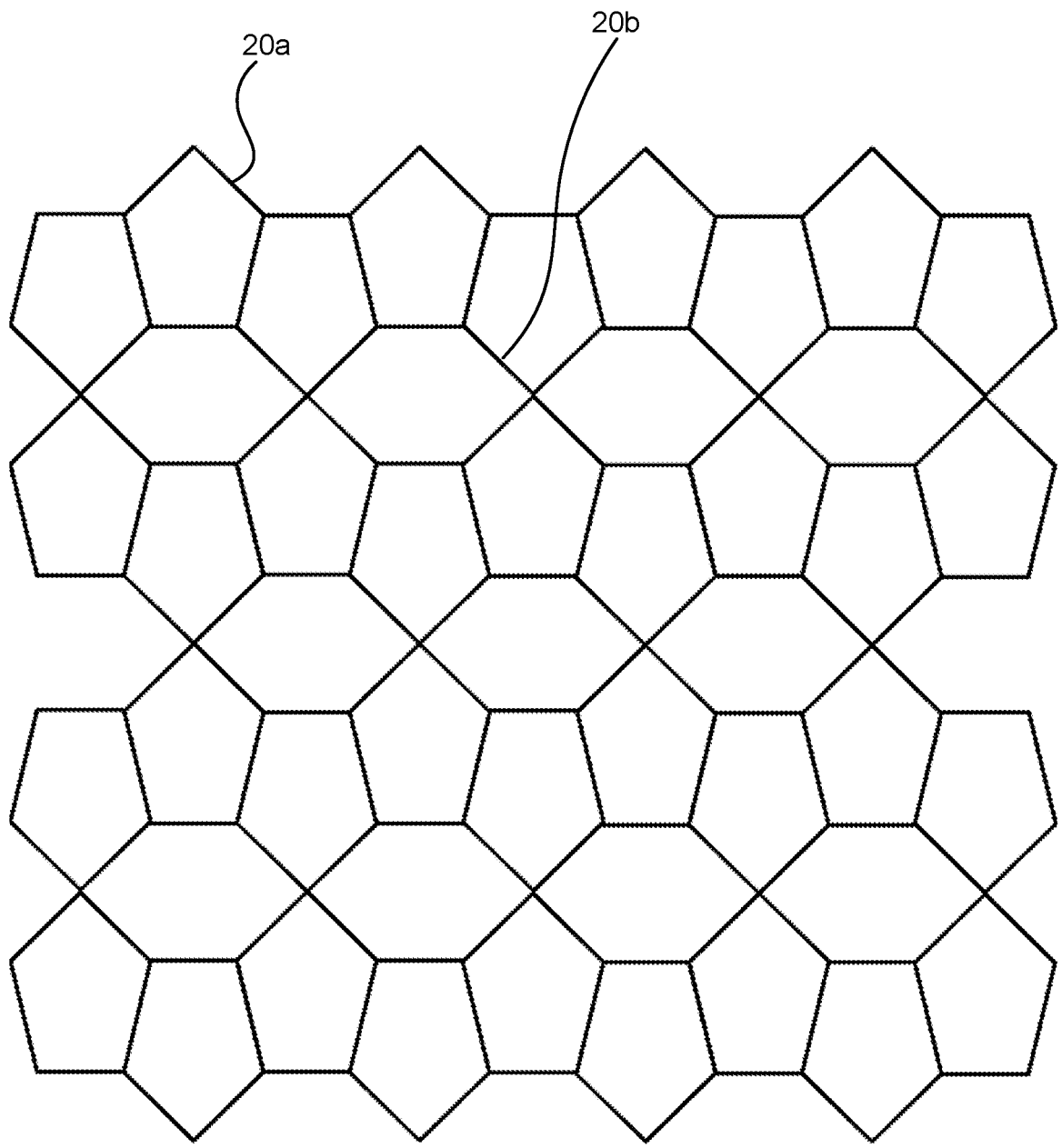
FIG. 5 is a representation of a plurality of regions periodically arranged in a tessellation according to another aspect of the invention.

In an aspect, two or more regions 20 of the plurality of regions 22 can have different outer geometric boundary in a tessellation. As shown in FIG. 4, a first region 20a, of the plurality of regions 22, has an outer geometric boundary in a hexagon shape. A second region 20b, of the plurality of regions 22, has an outer geometric boundary in an elongated diamond shape. The plurality of regions 22 includes a first region 20a and a second region 20b, in which the outer geometric boundary of the first region and the second region are different. FIG. 5 illustrates a plurality of regions 22 in which a first region 20a has an outer geometric boundary in a pentagon shape. A second region 20b, of the plurality of regions 22, has an outer geometric boundary in a hexagon shape.

Figure 6:
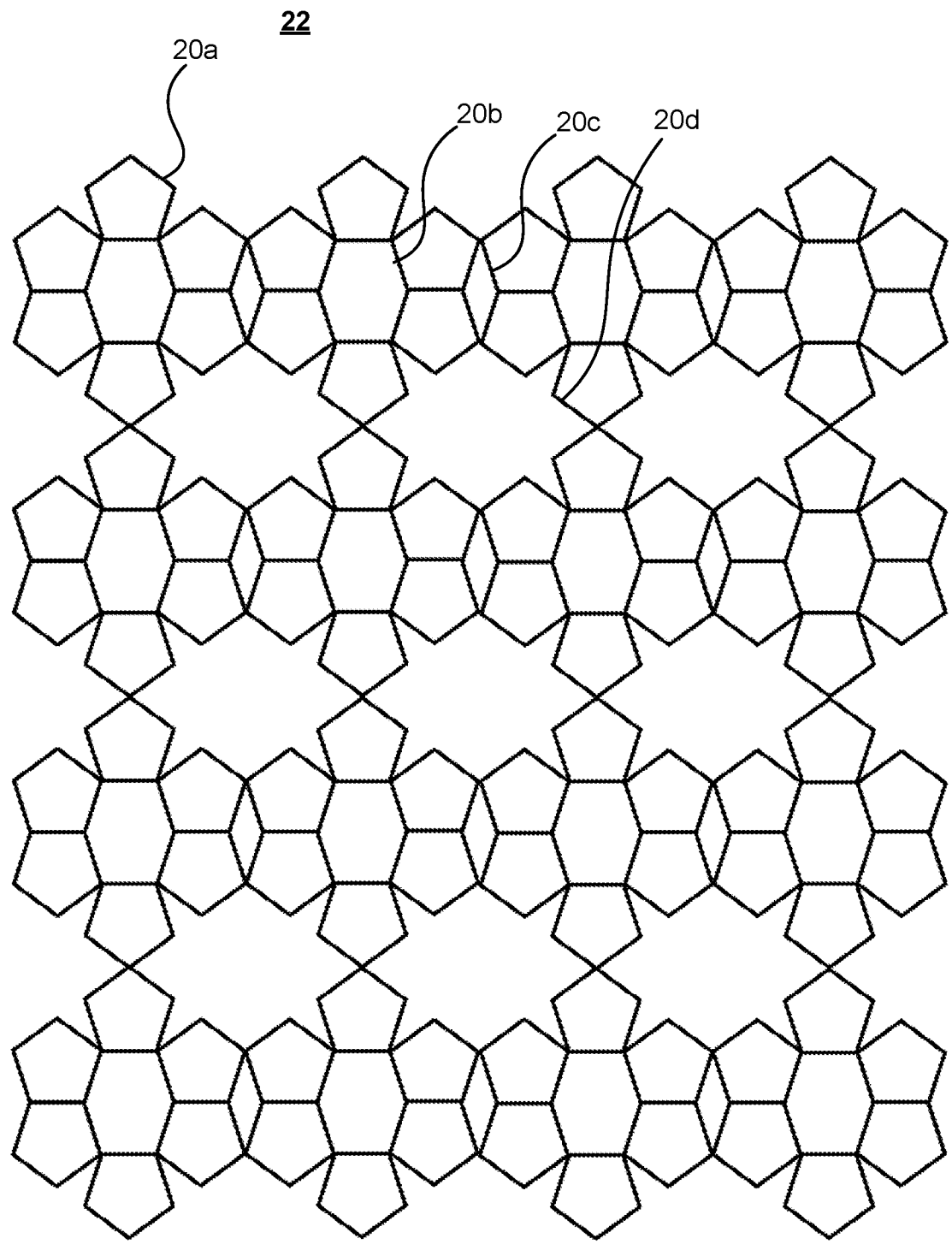
FIG. 6 is a representation of a plurality of regions periodically arranged in a tessellation according to another aspect of the invention.

The tessellations can be simple, as shown in FIGS. 2-3, for example, including each region 20 of the plurality of regions 22 having a same outer geometric boundary. In an aspect, the tessellations can be complex, as shown in FIGS. 4-6, for example, two or more regions 20 (20a, 20b, 20c, 20d) of the plurality of regions 22 can have different outer geometric boundaries. As shown in FIG. 6, the plurality of regions 22 includes a first region 20a having an outer geometric boundary in a pentagon shape, a second region 20b having an outer geometric boundary in a hexagon shape, a third region 20c having an outer geometric boundary in an elongated diamond shape, and a fourth region 20d having an outer geometric boundary in an arbitrary shape, such as a star shape.

Any number of regions 20 can be used in the plurality of regions 22. Additionally, or alternatively, each region 20 of the plurality of regions 22 can have a same or different random spatial distribution of microstructures. The regions 20 of the plurality of regions 22 can be placed in a periodic arrangement to form a tessellation for best contrast in the target pattern 7, 9.

Each region 20 can have a different random spatial distribution from one another. To be clear, each region 20 can be formed by the random spatial distribution of microstructures within the region 20. The random distribution of microstructures can be based upon the size of the region, the size of the microstructures, other variables, and combinations thereof. The random spatial distribution of microstructures within each region 20 can minimize periodic artifacts in a target pattern 7, 9 and can create a random spot distribution in a target pattern 7, 9.

Referring to FIG. 1 again, the optical element 10 can include a body 11 with a first surface 12a having a plurality of regions 22 periodically arranged in a tessellation, such as a first tessellation. The body 11 can include a second surface 12b having a plurality of regions 22 periodically arranged in a tessellation, such as a second tessellation, that is either the same or different from the first tessellation of the first surface 12a.

Referring again to FIG. 7, there is disclosed an optical system 100. The optical system 100 can include a light source 2; and an optical element 10a, 10b. The optical element 10a can include a first body 11a, and optical element 10b can include a second body 11b, as shown in FIG. 7. Each of the first body 11a and the second body 11b can be as described above with regard to the optical element in FIG. 1. For example, first body 11a can have a surface 12a having a plurality of regions 22 periodically arranged in a tessellation, such as a first tessellation, and in which each region 20 of the plurality of regions 22 has a random spatial distribution of microstructures. As another example, second body 11b can have a surface 12b having a plurality of regions periodically arranged in a tessellation, such as a second tessellation, and in which each region 20 of the plurality of regions 22 has a random spatial distribution of microstructures. In this manner, first body 11a can receive an input beam 5 from the light source 2 and can output a target pattern 7 based upon the first tessellation. Second body 11b can receive the target pattern 7 and can output a second target pattern 9 based upon the second tessellation.

In the case of two surfaces 12a, 12b on a single body 11 (FIG. 1) or with a first surface 12a on a first body 11a and a second surface 12b on a second body 11b (FIG. 7), it can be possible to extend the angular range of the target pattern 7, 9. In this case, one of the surfaces 12a, 12b can take the form of a microlens array.

Referring again to FIG. 2A, the dashed square shows a region 20 of the plurality of regions 22 in which each region 20 has a random spatial distribution of microstructures. In an aspect, each region 20 of the plurality of regions 22 has an identical random spatial distribution of microstructures. In another aspect, two or more regions of the plurality of regions 22 have different random spatial distributions of microstructures. The random spatial distribution of microstructures can shape an input beam 5 from a light source 2, such as a coherent light source, into a target pattern 7, 9, as shown in FIG. 7. The microstructures can be formed by a variety of methods, such as micro-replication, hot embossing, injection-molding, reactive-ion etching, or ion-beam milling, or single-point laser writing, as described, for example, in U.S. Pat. No. 6,410,213.

The microstructure can be defined, either in analytical or numerical form. For example, a microstructure can take the shape of a lens with a radius of curvature, conic constant, and possibly aspheric coefficients. In the publication "Efficient Structured Light Generator," A. Betzold, G. M. Morris, and T. R. M. Sales, in *Frontiers in Optics* 2016, OSA Technical Digest (Optical Society of America, 2016), paper FTu5A.4, there is disclosed a microlens based on a conic profile, that is, substantially described by a radius of curvature and conic constant. However, it has been found that the use of saddle lenses or microstructures, as described in U.S. Pat. No. 7,813,054 to Sales, which is incorporated herein by reference, by themselves or in combination with conic lenses provides further improvements due to its ability to generate uniform spot patterns. The microstructures of each region 20 can include a saddle shape. Other microstructures can be used in each region 20 other than those which are saddle shaped.

The saddle shaped microstructure can have a sag function defined as follows:

$$s(x, y; p) = \alpha \sqrt[p]{R_x - \sqrt[p]{R_x^p - (\kappa_x + 1)|x|^p}} \sqrt[p]{R_y - \sqrt[p]{R_y^p - (\kappa_y + 1)|y|^p}}, \quad (1)$$

where $\alpha$ is a real constant, $R_x$ and $R_y$ denote radii of curvature, and $\kappa_x$ and $\kappa_y$ are conic constants, and p is a real number, in the simplest case. The microstructures can also be defined as follows: $s(x,y)=\alpha xy$, (2) where again a is a real constant. Because of their visual appearance, the microstructures described by Eqs. (1) and (2) are saddle shaped lenses.

FIG. 8 illustrates contour plots of a microstructures, in which the outer geometric boundary is circular, square, hexagonal, and pentagonal. The outer geometric boundary can be defined mathematically by a function and general boundary functions, including irregular boundaries, polygon boundaries, and arbitrary shape boundaries. Contour diagrams of saddle-shaped microstructures, as described by Eqs. (1) and (2), and combinations thereof with a square boundary are shown in FIG. 9. Other relevant properties of saddle shaped microstructures are described in U.S. Pat. No. 7,813,054, the disclosure of which is hereby incorporated by reference.

As discussed above, the optical system 100 can generate a target pattern 7, 9 with a random distribution of spots. The optical system 100 can also include other components, such as sensors and computer algorithms for scene scanning and depth profiling.

The target pattern 7, 9 can be a random distribution of spots in accordance with the random spatial distribution of microstructures in each of region 20 of the plurality of regions. The random spatial distribution of microstructures can shape an input beam 5 from a light source 2 into a target pattern 7, 9 with speckle. The random distribution of spots can be over a specified angular range, and the same or different in two perpendicular directions. Such random distribution of spots, without a zero diffraction order higher intensity and fixed speckle with respect to an illumination motion can be useful in providing structured light in applications for 3D sensing.

In an aspect, a period, defining the periodic arrangement of each region having 20 in the tessellation, can be smaller than a size of the input beam 5 in order to increase the contrast of the target pattern 7, 9 and fix any speckle in the target pattern 7, 9 from varying with any movement of the input beam 5 relative to the optical element 10.

A target pattern 7, 9 can be created whereby a zero diffraction order is indistinguishable from others of interest in the random distribution of spots in terms of intensity. The zero diffraction order intensity can provide the same energy content as any other spot in the random distribution of spots. In this way, any issues related to eye safety can be eliminated. In addition, typically a single surface pattern can be used to produce a target pattern 7, 9, which ensures high efficiency. Multiple optical elements 10a, 10b used in series, such as illustrated in the optical system of FIG. 7, can be utilized for other reasons, such as to increase the effective input beam 5 range beyond what can be manufactured by existing fabrication methods. In such condition, one the optical elements 10a, 10b can be a simple microlens array.

Each region 20 of the plurality of regions 22 can determine the angular separation between two spots by a grating equation (for normal incidence):

$$\sin\theta_m = m\frac{\lambda}{\Lambda}, \quad (3)$$

where $\theta_m$ is a diffraction angle for order m, $\lambda$ is the wavelength of the input beam, and $\Lambda$ is a grating period. The overall tessellation geometry can have a direct correlation to the random spatial distribution of the microstructures. For instance, a square array tessellation (see e.g. FIGS. 2A-2C) produces diffraction orders on a square grid. Similarly, a hexagonal grid tessellation (see e.g., FIG. 3) produces orders on a hexagonal grid. The angular spacing depends on the grating period, which can be the same or different along different directions. The random spatial distribution of microstructures can produce a complex random spot distribution depending upon the periodic arrangement of each region 20 in the plurality of regions 22 to produce a tessellation. The tessellation geometry can determine the spot geometry, whereas each region 20 of the plurality of regions 22 determines the distribution of power among the various diffraction orders. In other words, the microstructures within each of the regions 20 have diffraction orders which by being either "turned on or off" create the random spot pattern.

A method of making an optical element, can comprise, selecting a periodic arrangement of a plurality of regions 22 to form a tessellation. The method also includes assigning each region 20 within a plurality of regions 22 to form a grating period. The method also includes randomly spatially distributing microstructures within each region 20 to form a plurality of regions. In an aspect, the microstructures within each region can include saddle shaped microstructures alone, or with other shaped microstructures.

Microstructures, such as those described in U.S. Pat. No. 7,813,054, can produce a random speckle pattern when used in isolation. In other words, a region 20 of microstructures when receiving an input beam 5 from a light source 2, such as a laser, can give rise to a target pattern 7, 9 with speckle and low resolution. Depending on the particular location of each region 20 that receives the input beam 5, the speckle pattern can vary.

The periodic arrangement of a plurality of regions 22 to form a tessellation can inhibit a movement of the target pattern 7, 9 with speckle in the event of movement of the light source 2 with respect to the microstructures. In this case, the target pattern 7, 9 can be said to be frozen in place. Furthermore, the periodic arrangement of the plurality of regions 22 can lead to an increase in the contrast of the target pattern 7, 9 that makes it useful for 3D sensing applications. A picture from a target pattern 7, 9 with speckle from an actual implementation of the optical element 10 is shown in FIG. 10, when illuminated by a light source 2, such as a laser of wavelength 633 nm.

The microstructures within each region 20 can have a specific focal length. In an aspect, a focal length on a first surface 12a can match a focal length on a second surface 12b regardless if two optical elements 10a, 10b (FIG. 11) are used in series or a single optical element 10 is used (FIG. 12). Because of the mirror symmetry, when placed against each other each microstructure in one optical element 10 faces its mirror image in the other.

There is also disclosed a method of using an optical system 100, including projecting an input beam 5 from a light source 2 to an optical element 10, wherein the optical element 10 includes a body 11 having a surface 12, wherein the surface 12 has a plurality of regions 22 periodically arranged in a tessellation, and wherein each region 20 of the plurality of regions 22 has a random spatial distribution of microstructures; and shaping the input beam 5 into a target pattern 7, 9. The method can also include fixing any speckle from the random spatial distribution of microstructures from varying with any movement of the input beam 5 relative to the optical element 10.

This scope disclosure is to be broadly construed. It is intended that this disclosure disclose equivalents, means, systems and methods to achieve the devices, activities and mechanical actions disclosed herein. For each composition, diffractive optical element, optical system, method, mean, mechanical element or mechanism disclosed, it is intended that this disclosure also encompass in its disclosure and teaches equivalents, means, systems and methods for practicing the many aspects, mechanisms and compositions disclosed herein. Additionally, this disclosure regards a composition and its many aspects, features and elements. Such a composition can be dynamic in its use and operation, this disclosure is intended to encompass the equivalents, means, systems and methods of the use of the composition and/or pigment of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An optical element comprising:
   a body having a surface,
   wherein the surface has a plurality of regions periodically arranged in a tessellation;
   wherein each region of the plurality of regions has an outer geometric boundary, wherein two or more regions of the plurality of regions have different outer geometric boundaries in a polygon shape; and
   wherein each region of the plurality of regions has a random spatial distribution of microstructures.

2. The optical element according to claim 1, wherein each region can be arranged in a repeating sequence in two orthogonal dimensions.

3. The optical element according to claim 1, wherein each region of the plurality of regions has an identical random spatial distribution of microstructures.

4. The optical element according to claim 1, wherein two or more regions of the plurality of regions have different random spatial distributions of microstructures.

5. The optical element according to claim 1, wherein the microstructures are saddle shaped.

6. The optical element according to claim 1, wherein the body having a surface includes a first surface and a second surface.

7. The optical element according to claim 6, wherein the second surface is oppositely oriented the first surface.

8. The optical element according to claim 1, wherein the body also has a second surface, wherein the second surface has a plurality of regions periodically arranged in a second tessellation, and wherein each region of the plurality of regions has a random spatial distribution of microstructures.

9. An optical system, comprising:
a light source, and
an optical element including a body having a surface, wherein the surface has a plurality of regions periodically arranged in a tessellation, wherein each region of the plurality of regions has an outer geometric boundary, wherein two or more regions of the plurality of regions have different outer geometric boundaries in a polygon shape, and
wherein each region of the plurality of regions has a random spatial distribution of microstructures.

10. The optical system according to claim 9, wherein the light source is a coherent light source.

11. The optical system according to claim 10, wherein the coherent light source is a laser.

12. The optical system according to claim 10, wherein the optical element projects a target pattern in accordance with the random spatial distribution of microstructures.

13. The optical system according to claim 12, wherein the target pattern is a random distribution of spots over a specified angular range.

14. The optical system according to claim 12, wherein the target pattern is different in two perpendicular directions.

15. The optical system according to claim 9, wherein a period defining the periodic arrangement is smaller than a size of an input beam from the light source in order to increase a contrast of a target pattern and fix speckle.

16. A method of using an optical system, comprising:
projecting an input beam from a light source to an optical element, wherein the optical element includes a body having a surface, wherein the surface has a plurality of regions periodically arranged in a tessellation, wherein each region of the plurality of regions has an outer geometric boundary, wherein two or more regions of the plurality of regions have different outer geometric boundaries in a polygon shape, and wherein each region of the plurality of regions has a random spatial distribution of microstructures; and
shaping the input beam into a target pattern.

17. The method according to claim 16, further comprising fixing any speckle from the random spatial distribution of microstructures from varying with any movement of the input beam relative to the optical element.

* * * * *